United States Patent [19]

Ankert et al.

[11] 4,092,945

[45] June 6, 1978

[54] FLOAT APPARATUS FOR BICYCLE

[76] Inventors: Walter Ankert; Ingrid Ankert, both of R.R. #1, Box 43, Ashburn, Ontario, Canada

[21] Appl. No.: 726,472

[22] Filed: Sep. 27, 1976

[51] Int. Cl.² .................................................. B60F 3/00
[52] U.S. Cl. ............................................ 115/2; 115/27; 280/7.15; 280/12.12; 280/289 R
[58] Field of Search ........................... 115/2, 25, 26, 27

[56] References Cited

U.S. PATENT DOCUMENTS

| 2,323,261 | 6/1943 | Vigo | 115/2 |
| 3,640,239 | 2/1972 | Petroskey | 115/27 |

FOREIGN PATENT DOCUMENTS

| 377,214 | 6/1964 | Switzerland | 115/26 |

Primary Examiner—Joseph F. Peters, Jr.
Assistant Examiner—Donn McGiehan
Attorney, Agent, or Firm—Robert D. Farkas

[57] ABSTRACT

A float apparatus for attachment to a conventional bicycle comprising a pair of frame members, each having an elongated pontoon extending from the front of the bicycle to the rear of the bicycle mounted thereon. Each frame member has a support rod extending from the frame to the rear wheel axle, a pivotal support rod extending from the frame to the front wheel axle and an upper elongated horizontal bar. The frame members are attached to opposite sides of the bicycle and are coupled to each other by fastening means coupled to the horizontal bars of the frame. The front wheel of the bicycle is provided with a rudder coupled thereto and the pedals are provided with paddle means coupled thereto.

5 Claims, 4 Drawing Figures

U.S. Patent  June 6, 1978  4,092,945
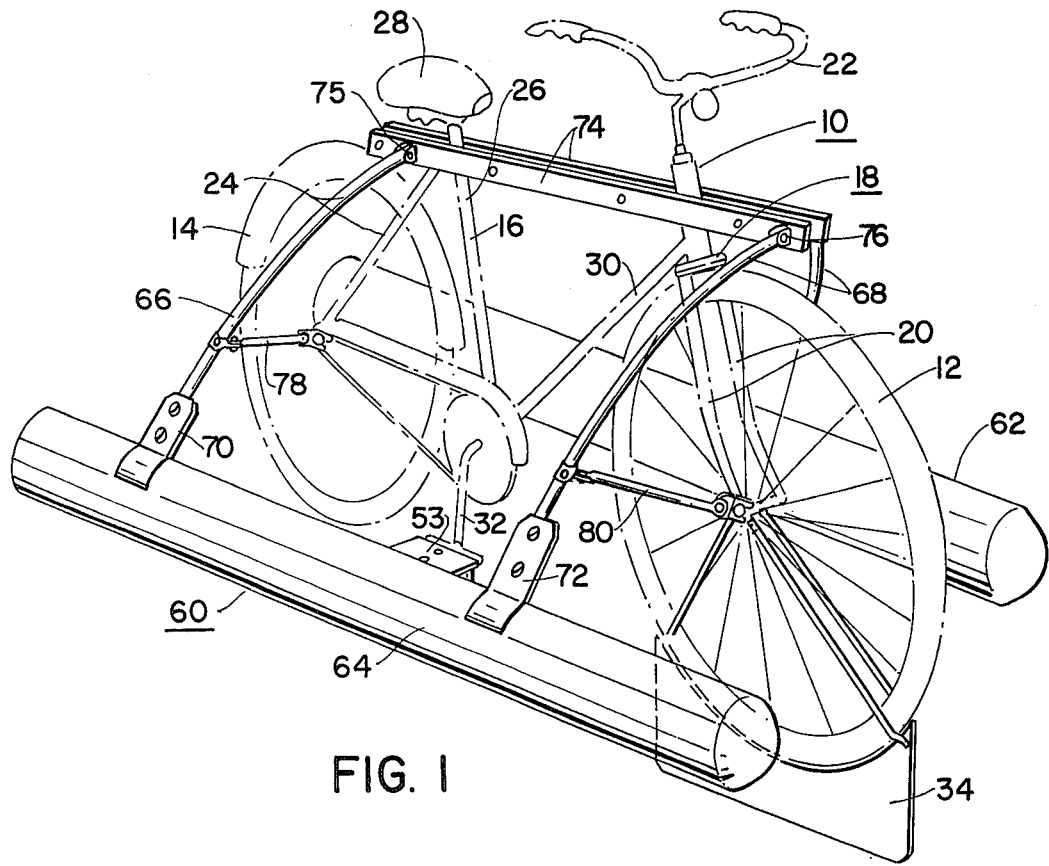
FIG. 1
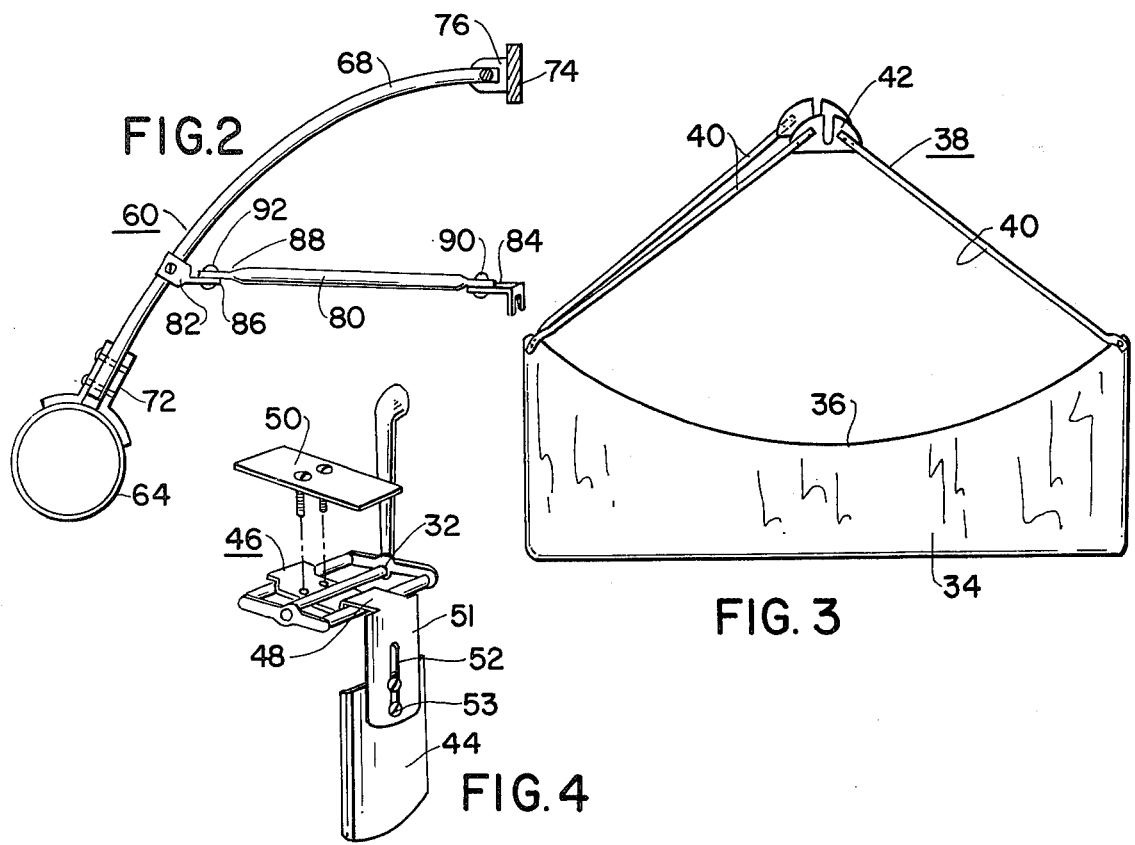
FIG. 2
FIG. 3
FIG. 4

FLOAT APPARATUS FOR BICYCLE

BACKGROUND OF THE INVENTION

1. Field of the Invention

This invention relates to a float apparatus for a bicycle and more particularly for a float apparatus including propelling means and steering means actuated by the bicycle.

2. Description of the Prior Art

The prior art discloses bicycle-like structures supported on a float apparatus and having water motive means driven by pedaling action of the operator. Examples of such art can be found with reference to U.S. Pat. Nos. 1,578,395 issued to G. E. Chapin and 1,920,391 issued to E. C. L. Herwig. These structures, however, do not make use of a conventional bicycle.

Also disclosed in the prior art are structures which employ conventional bicycles wherein pedaling action indirectly drives a propeller or paddle (U.S. Pat. Nos. 643,678; 799,667; 1,034,278; 2,304,430; 2,757,631 and 3,640,239).

Accordingly, I have invented a float apparatus which has a novel structure enabling it to be attached to a conventional bicycle whereby the bicycle is easily changed for aquatic use. The novel structure of my invention allows for direct drive of paddles with pedaling action and direct steering by a rudder directly coupled to the front wheel of the bicycle.

SUMMARY OF THE INVENTION

A float apparatus for a conventional bicycle comprises in combination, a rudder under the front tire of the bicycle and coupled directly to the front wheel assembly at the front fork whereby movement of the handlebars causes movement of the rudder, a paddle attached directly to each bicycle pedal and a left and right pontoon frame assembly including a pontoon and a frame for securing each pontoon to the bicycle at the front and rear forks thereof and means for coupling the left and right pontoon frame assemblies to each other securing the assemblies to the upper portion of the bicycle.

BRIEF DESCRIPTION OF THE DRAWINGS

FIG. 1 is an elevational isometric view of the novel apparatus;

FIG. 2 is a front elevational view of the right pontoon frame assembly;

FIG. 3 is a side elevational view of the rudder assembly; and

FIG. 4 is an isometric view of the paddle assembly.

DETAILED DESCRIPTION OF THE INVENTION

Referring to FIG. 1, there is shown a conventional bicycle 10, having front and rear wheels 12 and 14, respectively, and a bicycle frame 16. The frame 16 comprises a front fork assembly 18 terminating in front forks 20 to which the front wheel 12 is mounted and a handlebar 22 which controls the turning of the front wheel 12. The bicycle frame 16 also includes a rear fork 24 for mounting the rear wheel 14; a vertical support member 26 to which a seat 28 is mounted; and a transverse member 30 extending from the top portion of the front fork assembly 18 to the bottom of the vertical support member 26 where they meet in a hub for the pedals 32.

The novel float apparatus consists of a rudder 34, the top surface 36 of which is formed in an arc having a curvature so as to conform to the shape of the front wheel 12. The rudder 34, shown more clearly with reference to FIG. 3, is a relatively thin, flat member having straight vertical sides and a straight bottom. It should be understood, however, that the general configuration of the rudder need not be limited to that shown in the FIG. 1 and other shapes are also suitable. The rudder 34 is attached to the front wheel forks 20 by the rudder mounting means 38. This means 38 consists of a set of four transverse, upwardly extending support rods 40 bolted in pairs to the left and right corners of both sides of the rudder 34. The rods 40 on the same side of the rudder 34 meet at and are connected to a bracket 42 having a notch which fits around the wheel mounting bolt at the front forks 20 and are secured thereto.

A paddle 44, shown in FIG. 4, is coupled to each pedal 32 by paddle mounting means 46. The paddle mounting means consists of a paddle mounting bracket 48 and bracket locking means 50 which locks the bracket to the pedal 32. The bracket 48 includes a downwardly extending, slightly arcuate shaped portion 51 having an elongated notch 52 therein. The paddle 44 is a rectangular, slightly arcuate member, the arc of which conforms to that of the notched section of the bracket 48. The paddle 44 is adjustably mounted to the bracket by means of nuts and bolts 53 which pass through the notch 52 of the bracket 48 and holes provided in the paddle 44. Adjustment of the paddle-bracket assembly allows for selection of the desired depth of the paddle in the water.

Pontoon assemblies 60 and 62, which are mirror images of each other, are mounted to the right and left sides of the bicycle 10 and are coupled to each other. These assemblies consist of an elongated pontoon 64 or float extending from the rear to the front of the bicycle 10 having spaced and substantially parallel arcuate support bars 66 and 68 extending upwardly toward the top portion of the bicycle frame. The support bars 66 and 68 are preferably spaced so that they extend behind the seat and in front of the front fork assembly, respectively, and are of a length that causes the longitudinal axis of the pontoon to be at or below the level of the bottom of the wheels 12 and 14. The support bars 66 and 68 are mounted to the pontoon by means of mounting brackets 70 and 72, respectively. The upper end of the support rods are mounted to a horizontal member 74 by means of mounting brackets 75 and 76. The horizontal members 74 of each pontoon assembly are coupled to each other by means of nuts and bolts. The pontoon assemblies 60 and 62 are given added support by way of front and back fork coupling rods 78 and 80. These rods 78 and 80 are mounted to the bicycle 10 by coupling to the bolts which extend through the forks to hold the bicycle wheels 12 and 14 and to the pontoon support bars 66 and 68 by means of mounting brackets 82 and 84. Since the front wheel 12 must be capable of turning so as to move the rudder 34, the front fork coupling rod 80 should be pivotably mounted. This can be accomplished by providing a bracket 82 which is secured to the support bar 68 and has a horizontally extending portion 86 provided with a hole. The ends 88 and 90 of the rod 80 are also flat and are provided with a hole. The flat surfaces of the rod 80 and bracket 82 are juxtaposed and the holes aligned one over the other. A pivot pin 92 is provided securing the rod to the bracket. A similar provision is made at the other end of the rod 80 which is pivotably coupled to the bracket 84 which is mounted at the front fork 20.

We claim:

1. A float apparatus for a conventional bicycle, said bicycle having a frame including a front fork assembly terminating in a fork and mounting means for mounting a front wheel and a handlebar coupled thereto, a rear fork assembly and rear wheel mounting bolts, a seat, and pedals, said float apparatus comprising in combination, a rudder under said front wheel of said bicycle and coupled directly to said front fork assembly whereby movement of said handlebar causes movement of said rudder, a paddle mounted directly on each pedal by means of a mounting bracket, and a left side and a right side pontoon assembly, each assembly including a pontoon, each assembly including a frame for securing said pontoon to said bicycle at the front and rear forks thereof having spaced essentially parallel transversely extending arcuate front and rear support bars mounted to said pontoon and extending to the upper portion of said bicycle frame where said bars are coupled to each other by a horizontal support member, a front essentially horizontal support bar extending from said arcuate transverse front support bar to said front fork of said bicycle and being pivotally mounted to said transverse front support bar and said fork, and means for coupling the left side and right side pontoon assemblies to each other along the upper portion of said bicycle frame.

2. The apparatus recited in claim 1 wherein said rudder has an arcuate top surface which conforms to the curvature of said front wheel.

3. The apparatus recited in claim 1 wherein said paddle is cupped.

4. The apparatus recited in claim 3 wherein said paddle mounting bracket is provided with an elongated slot for adjusting the depth of said paddle.

5. The apparatus recited in claim 1 wherein said rear arcuate support bar extends to a point behind said seat and wherein said front arcuate support bar extends to a point above said front wheel.

* * * * *